United States Patent [19]

Chianelli

[11] 3,987,590

[45] Oct. 26, 1976

[54] METHODS OF FABRICATING THERMONUCLEAR FUEL ELEMENTS

[75] Inventor: Russell R. Chianelli, Brooklyn, N.Y.

[73] Assignee: University of Rochester, Rochester, N.Y.

[22] Filed: Feb. 5, 1975

[21] Appl. No.: 547,143

[52] U.S. Cl. ............................... 51/323; 51/289 S; 51/324; 264/.5
[51] Int. Cl.² ..................... B24B 1/00; G21C 21/02
[58] Field of Search ............... 51/281 R, 289 S, 323, 51/324, 327; 176/1; 264/.5

[56] References Cited
UNITED STATES PATENTS

| | | | |
|---|---|---|---|
| 2,734,317 | 2/1956 | Bond | 51/289 S X |
| 3,355,393 | 11/1967 | Swanson | 264/.5 X |
| 3,526,575 | 9/1970 | Bennett | 176/1 |
| 3,652,393 | 3/1972 | Kaiser | 176/1 |
| 3,723,246 | 3/1973 | Lubin | 176/1 |
| 3,791,921 | 2/1974 | Stanton | 176/1 |
| 3,899,681 | 8/1975 | Beckner et al. | 176/1 X |

OTHER PUBLICATIONS

Tanimoto et al., J. Phys. E., "Laser Plasma Generation . . .", vol. 5, No. 1, Jan. 1972.

Primary Examiner—Al Lawrence Smith
Assistant Examiner—Nicholas P. Godici
Attorney, Agent, or Firm—Martin LuKacher

[57] ABSTRACT

Thermonuclear fuel elements used as targets which are radiated by pulse laser radiation of high energy level to produce laser fusion as for thermonuclear energy generation are made out of materials not heretofore available for such use. Such materials are deuterium compounds which could not be fabricated into spheres suitable for laser fusion targets by the melting or freezing methods of fabricating such fuel elements which were heretofore available, since such compounds are peritectic (viz., they decompose or sublimate before melting can occur). By grinding bodies of such deuterium compounds, laser fuel elements are provided of the requisite minute size and spherical configuration such that they are available for use in quantity as thermonuclear fuel elements in laser fusion apparatus.

12 Claims, No Drawings

METHODS OF FABRICATING THERMONUCLEAR FUEL ELEMENTS

The present invention relates to methods for the fabrication of thermonuclear fuel elements and particularly methods of fabricating laser fusion targets from deuterium compounds which have not heretofore been available for such use by virtue of their physical and chemical properties.

The invention is especially suitable for use in providing fusible fuel material for thermonuclear reactors and is also useful in providing fuel for use in apparatus wherein laser fusion takes place to produce neutrons of high energy level as for thermonuclear energy generation, the production of fissile materials, the production of thermonuclear plasmas, or for exciting other nuclear reactions.

In nuclear fusion apparatus, it is desirable to use deuterium or deuterium compounds as a fusible material. Radiation is made incident upon a body of such material, as by locating the body as a target at the focus of a beam from a high power pulse laser. Reference may be had to the following patents for further information respecting such nuclear fusion apparatus which apparatus uses a body of pure deuterium as a target: U.S. Pat. Nos. 3,723,246, issued Mar. 27, 1973; 3,489,645, issued Jan. 13, 1970; 3,378,446, issued Apr. 16, 1968; 3,155,592, issued Nov. 3, 1964; and 3,094,474, issued June 18, 1963. Reference may also be had to the following articles for more detailed information respecting laser produced plasmas and related laser fusion apparatus in which fuel elements provided by the invention may be utilized: M. Lubin, J. Soures, and L. Goldman — Paper 1C11, Bull. Am. Phys. Soc. 18, 1256 (1973); and J. Soures, L. Goldman and M. Lubin, Nuclear Fusion, Vol. 13, No. 6 (1973).

Inasmuch as the coupling of laser radiation to the fuel element is a function of the geometry of the element, it is desirable that the element be solid and it is especially desirable that the element be symmetrical, with spherically-shaped elements being especially desirable. In order to provide such elements from pure deuterium or from deuterium containing compounds, complex equipment is required for melting and or freezing such compounds to provide fuel elements at the requisite size and shape. Methods of making such fuel elements have involved melting followed by freezing as can occur by solidification to room temperature. In the case of pure deuterium, complex cryogenic equipment is required to freeze the target. It has recently been proposed to provide targets for the use of deuterium containing paraffin compositions, particularly n-deuterated hexatriacontane (see Patent Application, Ser. No. 479,921, filed June 17, 1974, in the name of Gerald M. Halpern and Yehuda Paiss, and assigned to the same assignee as this application). Even such compositions must be melted before bodies thereof of the requisite size and shape for use as laser fusion fuel elements may be fabricated.

It has been discovered in accordance with this invention that other deuterated compounds which could not be used as thermonuclear fuel elements can be provided for such use in spite of their peritectic nature, by which is meant their propensity to decompose or sublimate in the course of their melting or freezing. Such materials include deuteroammonia compounds, deuterohydrazine compounds, deuteroboron compounds, deuterosalts, and compounds containing deuterium oxide hydrates. In general, these compounds are in the form of hard crystalline materials, but if such materials were heated they would decompose before melting. The foregoing compounds are provided for use as nuclear fuel elements in laser fusion apparatus when fabricated by a method embodying the invention which, briefly described, includes the step of grinding bodies of the selected compounds until they are formed into pellets of substantially spherical shape and are of a final size from 75 to 250 microns in diameter. These pellets are located in the laser fusion apparatus in which thermonuclear reactions occur upon the materials therein to produce thermonuclear plasmas, fast neutrons, and thermonuclear energy.

Accordingly, it is an object of the present invention to provide a new use for peritectic deuterium compounds as laser fusion fuel elements.

It is a further object of the present invention to provide improved methods for the fabrication of thermonuclear fuel elements.

It is a still further object of the present invention to provide a method which permits the use of hard crystalline deuterated compounds such as deuteroammonia, deuterohydrazine and deuteroboron compounds as laser fusion elements.

It is a still further object of the present invention to provide an improved method of fabricating thermonuclear fuel elements from deuteroammonia, deuterohydrazine, deuteroboron, and other peritectic deuterium containing compounds by means of which laser fusion fuel elements of uniformly small size and substantially spherical shape can be produced in quantity.

The foregoing and other features, objects and advantages of the invention will become more apparent from the following description of exemplary techniques for practicing and carrying out the invention.

The material used in fabricating the laser fusion fuel elements or targets in the following examples, may be deuteroammonia and ammonium compounds such as $ND_4 Cl.3ND_3$, $ND_4 Cl$, $ND_4F$ and $ND_4 ND_2 CO_2$, $ND_4 DF_2$, $ND_4 Cl.3ND_3$. These materials may also be deuterohydrazine compounds such as $N_2 D_5 Cl$, $N_2 D_6 Cl_2$, $N_2 D_6 F_2$, $C_6 D_5 ND ND_2 Cl.DCl$. The deuteroboron compound $B_4 D_{10} (ND_3)_2$ may also be used as a material from which the fuel elements may be fabricated. The materials may also be the organolithium compound $Li CD_3$, the lithium deuteroboron compound $Li BD_4$, and also the alkaline earth hexamine and alkaline earth salt hexamine compounds $Ca (ND_3)_6 F_2$, $Mg (ND_3)_6 Cl_2$, $Ca (ND_3)_6$, and $Mg (ND_3)_6$. These materials are preferably in crystalline form and may be grown as crystals which are approximately 25 percent larger in maximum dimensions (across their longest edge) than the final diameter of the pellets which are fabricated for use as the laser fusion fuel elements. Preferably, crystalline materials which are in the cubic class are also used. Crystals belonging to other crystalline class may also be used. The pellets which are formed may be somewhat less than perfect spheres due to their anisotropic hardness. In the event that the crystals are not initially grown to the desired size, the material may be crushed, as with a mallet, and bodies of the material selected which are approximately 25 percent larger than the diameter of the spherical pellets which are to be produced. For example, if spherical pellets of $N D_4 Cl$ having a diameter of 200 microns are desired, it is preferable to select bodies of crystalline $N D_4 Cl$ which are cubes approximately 250 microns along the edge. While the selection of bodies of the foregoing size is preferable, since it reduces the time needed to produce the final product, other sizes and shapes of the deuterated compounds mentioned above may be used as starting material in practicing the method.

It is desirable to use a pressurized gas driven centrifugal grinder; the grinder Model Nos. 220, 320 or 400 sold by ENRAF NONIUS, INC., 130 County Court House Road, Garden City Park, New York, 11040, being suitable. This grinder makes use of compressed air or nitrogen which causes the materials being ground to swirl around in the form of centroid and be tossed by centrifugal force against an abrasive coated wall in a grinding chamber. Grinding is preferably carried out in four steps. In the first step the crystals are ground using a coarse abrasive. In the second step which follows the first step, a medium abrasive is used in the grinding process. In the third step a fine abrasive is used. Finally, the last step is a polishing step, preferably using a 400 mesh diamond embedded grinding ring in the aforementioned grinder.

In the event that the compound being ground is air or water sensitive (viz., it may exchange hydrogen for deuterium easily), it is desirable to use a dry inert gas such as nitrogen to drive the grinder. In the case of the alkaline earth hexamine and salt hexamine compounds, the gas should be cold — having a temperature just above the boiling point of liquid nitrogen to avoid decomposition of the material. Grinding time for each of the four steps mentioned above with pressurized air at 15 psi is approximately 12 hours for each step. The resulting pellets were 75 microns in diameter. The starting material was cubic crystalline material approximately 100 microns along an edge. It will be appreciated that the number of grinding steps each involving a grinding material of successively finer abrasive and the duration of these steps may differ depending upon the hardness of the material and the starting condition (viz., whether materials of size and shape as indicated above are initially selected). In the four step and 12 hours case specified above, the material used was crystals of $ND_4 CL$ obtained from Ventron Corp., Beverly, Mass, 01915.

The number of steps and the grinding time also depend upon the diameter of the spherical pellets which are desired. Laser fuel element pellets of spherical shape from 75 to 250 microns may be fabricated to the practice of the method set forth above. The exact number of steps and the duration of each step being dependent upon the difference between initial and final size of the pellets and the hardness of the material.

After fabrication, the pellets may be located in an evacuated chamber at the focus of a lens which focusses a high intensity laser beam upon an area of the pellet which has the diameter much less than the pellet diameter (a focal spot of about 20 microns being suitable). The laser may contain a neodymium glass oscillator followed by five neodymium rod amplifier stages which produces a beam of radiation of $1.06 \times 10^{-6}$ meter wavelength in a pulse of $10^{-10}$ second duration. The energy of the pulse may be from 15 to 50 joules. The beam may be optically split into four beams (or four lasers may be used) to irradiate the target from four diametrically opposed points, if desired.

The target pellets are located in a vial in the chamber. A glass fiber (say 10 microns in diameter) is held in a triaxially adjustable manipulator. The end of the fiber is dipped into the vial and one or more plastic pellets adhere thereto. The manipulator is then adjusted to locate the pellet at the focal spot of the beam or beams. The laser pulse is then generated and produces a thermonuclear reaction by the laser fusion process. Fast neutrons are produced and thermonuclear energy is generated. Reference may be had to the above-mentioned articles by Lubin, et al and Soures, et al for further discussion as to the laser fusion process and apparatus for carrying out the same.

From the foregoing description, it will be apparent that there has been provided improved methods for providing laser fusion fuel elements. Examples of compounds which are enabled for use as such laser fusion fuel elements and the methods by which such compounds may be fabricated into such fuel elements have been described herein. Variations and modifications of these methods, within the scope of the invention, will undoubtedly suggest themselves to those skilled in the art. Accordingly, the foregoing description should be taken as illustrative and not in any limiting sense.

What is claimed is:
1. The method of making nuclear fuel elements for use in laser fusion apparatus comprising the steps of
   a. selecting bodies of peritectic material consisting of a compound of deuterium and at least one other element, and
   b. grinding said bodies until said bodies are formed into pellets of substantially spherical shape and of final size from 75 to 250 microns diameter.
2. The invention as set forth in claim 1 wherein said material consists of compounds selected from the class of deuteroammonia compounds, deuterohydrazine compounds, deuteroboron compounds, deuterosalt compounds and compounds containing deuterium oxide hydrates.
3. The invention as set forth in claim 1 wherein said grinding step comprises the steps of successively grinding said bodies with the aid of successively finer abrasives.
4. The invention as set forth in claim 3 wherein said grinding step further comprises the performance after said successive grinding steps of the step of polishing said bodies to form them to final shape and size.
5. The invention as set forth in claim 1 wherein said method comprises the initial step of growing crystals of said material until they are larger than said final size by at least 25 microns along an edge for use in said grinding step.
6. The invention as set forth in claim 1 including the initial step of sorting said bodies to provide bodies of initial size larger than said final size by at least 25 microns along an edge thereof and which are of about the same initial size for use in said grinding step.
7. The invention as set forth in claim 6 further comprising the final step of sorting said spherical bodies into groups containing bodies of substantially the same diameter.
8. The invention as set forth in claim 4 wherein said grinding and polishing steps are carried out with the aid of a pressurized gas driven centrifugal grinder.
9. The invention as set forth in claim 2 wherein said bodies consist of deutero ammonia compounds selected from the class consisting of $ND_4 Cl.3ND_3$, $ND_4 Cl$, $ND_4F$ and $ND_4 ND_2 CO_2$ and $ND_4 DF_2$.
10. The invention as set forth in claim 2 wherein said bodies consist of deuterohydrazine compounds selected from the class consisting of $N_2 D_5 Cl$, $N_2 D_6 Cl_2$, $N_2 D_6 F_2$, and $C_6 D_5 ND ND_2 Cl.DCl .DCl$.
11. The invention as set forth in claim 2 wherein said bodies consist of deuteroboron compound $B_4 D_{10} (ND_3)_2$.
12. The invention as set forth in claim 2 wherein said bodies consist of lithium containing compounds selected from the class consisting of $Li CD_3$ and $Li BD_4$.

* * * * *